(12) United States Patent
Dietz et al.

(10) Patent No.: US 6,713,889 B2
(45) Date of Patent: Mar. 30, 2004

(54) MOTOR-GENERATOR SYSTEM FOR A MOTOR VEHICLE WITH HYBRID TRACTION DRIVE

(75) Inventors: Armin Dietz, Margetshoechheim (DE); Hailong Gao, Zell am Main (DE); Martin Vickermann, Wuelfershausen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/133,452

(22) Filed: Apr. 29, 2002

(65) Prior Publication Data

US 2002/0171246 A1 Nov. 21, 2002

Related U.S. Application Data

(60) Provisional application No. 60/288,800, filed on May 7, 2001.

(30) Foreign Application Priority Data

Apr. 27, 2001 (EP) ............................................. 01110447

(51) Int. Cl.⁷ ................................................. B60L 11/04
(52) U.S. Cl. .................................... 290/40 C; 310/112
(58) Field of Search ................................ 290/40 C, 45; 310/112, 113, 114

(56) References Cited

U.S. PATENT DOCUMENTS

| | | | | |
|---|---|---|---|---|
| 3,675,117 A | * | 7/1972 | Reimers ...................... | 322/31 |
| 5,015,903 A | * | 5/1991 | Hancock et al. ............. | 310/168 |
| 5,675,203 A | * | 10/1997 | Schulze et al. ............. | 310/113 |
| 5,675,222 A | * | 10/1997 | Fliege ........................ | 318/139 |
| 5,744,895 A | * | 4/1998 | Seguchi et al. ............. | 310/266 |
| 5,753,989 A | * | 5/1998 | Syverson et al. ........... | 310/114 |
| 5,838,085 A | * | 11/1998 | Roesel et al. ............... | 310/113 |
| 5,917,248 A | * | 6/1999 | Seguchi et al. .............. | 290/31 |
| 6,040,634 A | * | 3/2000 | Larguier ...................... | 290/45 |
| 6,326,713 B1 | * | 12/2001 | Judson ........................ | 310/112 |
| 6,376,955 B1 | * | 4/2002 | Arimitsu ..................... | 310/114 |
| 6,380,653 B1 | * | 4/2002 | Seguchi ....................... | 310/112 |

FOREIGN PATENT DOCUMENTS

| | | | |
|---|---|---|---|
| DE | 44 44 545 A1 | 6/1995 | |
| JP | 7-231502 A | 8/1995 | |
| JP | 09023509 A | * 1/1997 | ........... B60L/11/14 |

* cited by examiner

Primary Examiner—Joseph Waks
(74) Attorney, Agent, or Firm—Sughrue Mion, PLLC

(57) ABSTRACT

A motor-generator system of a hybrid drive with an internal combustion engine (ICE) and an electric machine (EM) connected to an energy storage device (BA) via a converter device (CD). The motor-generator system can be used in addition to supply external power consumers (PC) in isolated operation, with little incremental complexity. For this purpose, the electric machine (EM) includes, in addition to a first stator winding (W1) for traction operation, a second stator winding (W2) for isolated generator operation. The second stator winding (W2) is advantageously coupled in transformer-fashion to the first stator winding (W1) and can thus be supplied with magnetizing current from the energy storage device (BA) via the converter device (CD).

20 Claims, 6 Drawing Sheets

MOTOR-GENERATOR SYSTEM FOR A MOTOR VEHICLE WITH HYBRID TRACTION DRIVE

The present application claims priority from European Patent Application No. 011 10 447.8, filed Apr. 27, 2001, and U.S. Provisional Application No. 60/288,800, filed May 7, 2001. The disclosures of these two priority applications are incorporated into the present application by reference.

FIELD OF AND BACKGROUND OF THE INVENTION

The present invention relates to a motor-generator system for a motor vehicle with hybrid traction drive.

German Laid-Open Publication DE 44 44 545 A1, for instance, discloses the basic construction principles of hybrid traction drives, on which the present invention is based. In traction operation, an internal combustion engine and/or an electric machine that is supplied with current by a battery, drive the vehicle either alone or jointly. On the other hand, in braking operation or the like, the electric machine, as a generator, recovers energy and supplies it to the battery. In the aforementioned prior art, in order to increase the range achievable by the traction drive of the electric machine, an additional generator driven by the internal combustion engine is provided for charging the battery. Japanese Laid-Open Publication JP 07 23 1502 A discloses an induction motor in which the battery is charged without the need for an independent charger.

OBJECTS OF THE INVENTION

One object of the present invention is to better utilize the investment that is required for the basic structure of a motor-generator system. A related object is to expand the range of application of a vehicle equipped with such a motor-generator system.

SUMMARY OF THE INVENTION

According to the invention, these and other objects are attained by a motor-generator system for a motor vehicle with hybrid traction drive that includes an internal combustion engine, an electric machine operable as a drive motor or as a generator driven by the internal combustion engine, a first stator winding assigned to the traction drive, a second stator winding assigned to stationary isolated generator operation of the electric machine, and external power consumers that are electrically supplied via the second stator winding.

The inventive motor-generator system jointly uses the basic equipment that is already installed for the traction drive and merely adds essentially one additional stator winding. This permits a vehicle equipped with the inventive motor-generator system to be used for stationary isolated generator operation as a so-called utility vehicle, to supply stationary power consumers, e.g. tools such as drills, electric saws or pumps, on construction sites or similar "islands" where domestic power grid connections are not or are not yet available.

The additional stator winding provided in the electric machine may be separated from the existing first stator winding. Preferably, the additional stator winding is electrically insulated from the first stator winding but is accommodated in the same laminated core, preferably in common slots. Advantageously, the additional stator winding is used in traction operation as an additional electric booster, and in generator operation for increased recharging of the battery. The electric machine is preferably embodied as an asynchronous machine with a squirrel cage rotor, in particular in view of the middle-level power requirements for these types of uses.

Advantageously, the already existing converter device can be jointly used, for voltage control and VAr (reactive power) control of the second stator winding. For this purpose, the second stator winding is transformer-coupled to the first stator winding, and to those devices controlling the first stator winding, in the same laminated core that receives the first stator winding. Although the converter device supplies a pulse-width modulated voltage that is only approximately sinusoidal, the transformer coupling of the second stator winding to the first stator winding has the advantage of achieving a filter effect, such that the harmonic content of the output voltage is reduced and its shape thereby better approximates the desired sinusoidal curve.

BRIEF DESCRIPTION OF THE DRAWINGS

The invention as well as further advantageous aspects of the invention, e.g. in accordance with the limitations set forth in the dependent claims, will now be described in greater detail with reference to the schematic exemplary embodiments depicted in the drawing in which:

DETAILED DESCRIPTION OF THE PREFERRED EMBODIMENTS

Figure 1:
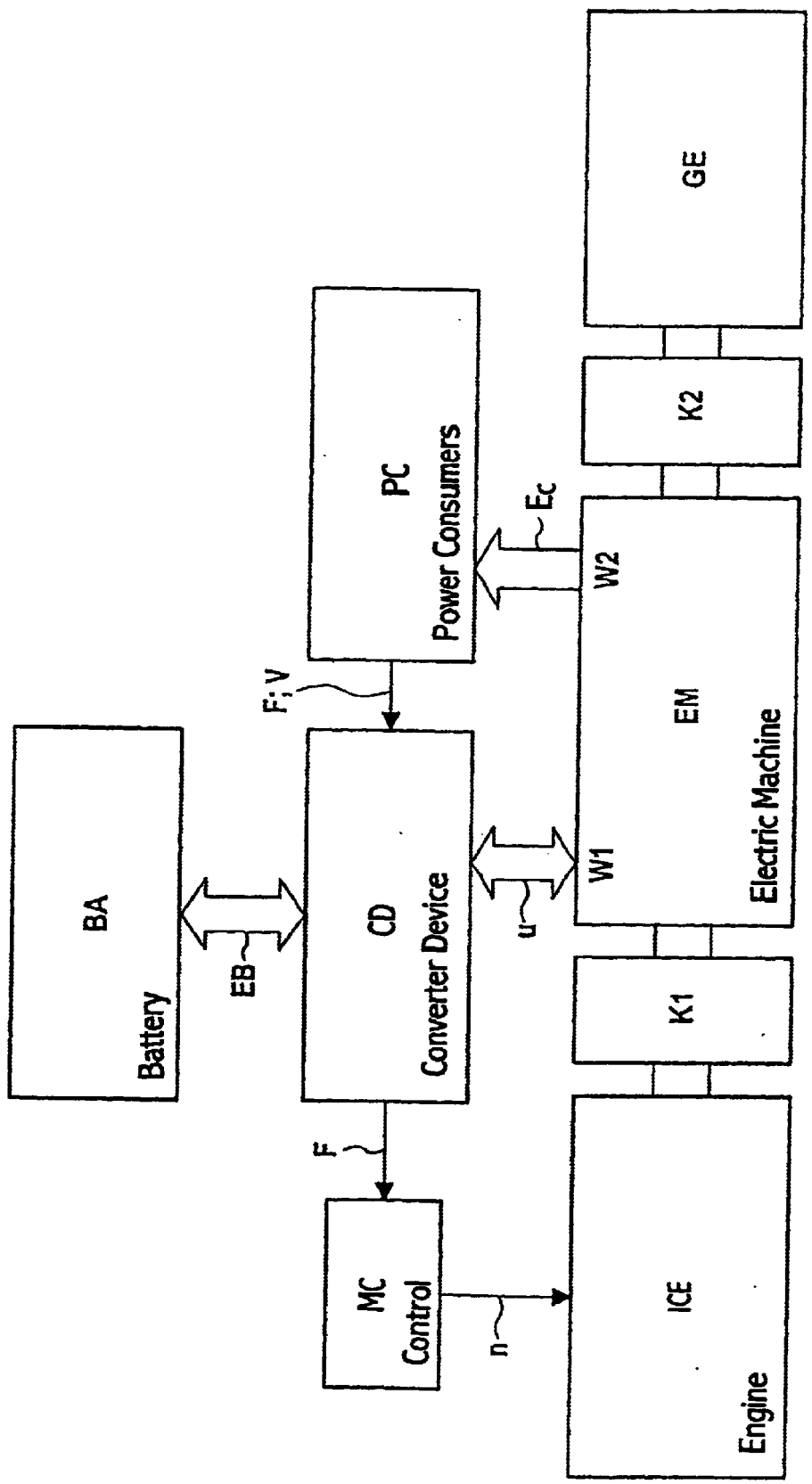
FIG. 1 is a block diagram of an inventive motor-generator system, in isolated generator operation.
Figure 2:
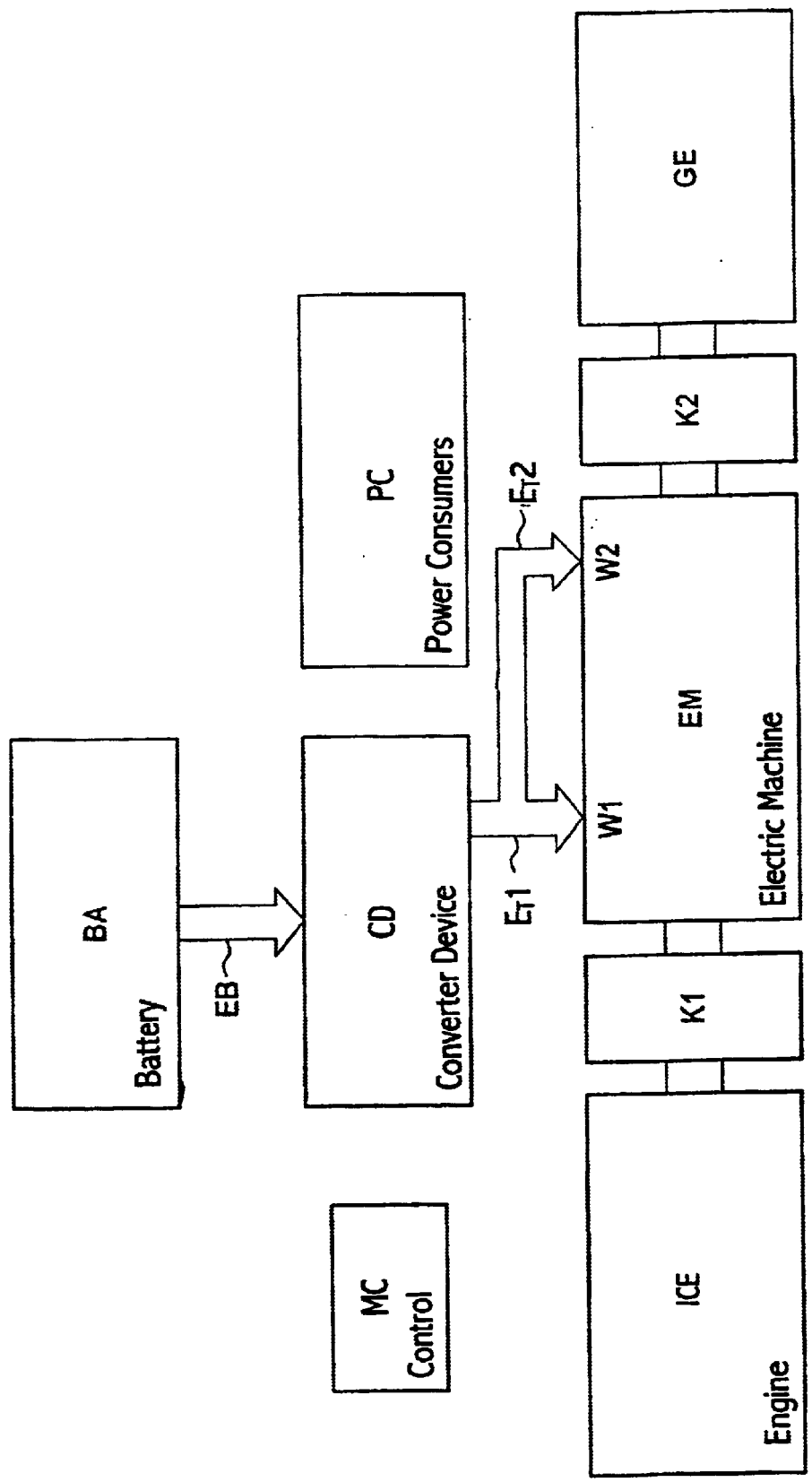
FIG. 2 is a block diagram of the motor-generator system of FIG. 1, in traction operation.

FIGS. 1 and 2 show a block diagram of a hybrid drive system with a serial arrangement of an internal combustion engine ICE with an electric machine EM, in the form of an asynchronous machine, and a gear unit GE with clutches K1 and K2, respectively, inserted there-between. According to the invention, the electric machine EM, in addition to having a conventional first stator winding W1 for an electric traction drive, has a second stator winding W2 to supply external power consumers PC, in isolated operation. For traction operation, a battery BA is normally provided as the electrical energy storage device, which, according to FIG. 2, supplies a total energy flow $E_T$ via a converter device CD as a regulated and converted energy flow $E_T1$ to the first stator winding W1. In addition, according to a preferred, advantageous embodiment, the battery BA also supplies an energy flow $E_T2$ to the second stator winding W2 for the electric traction drive.

In isolated generator operation according to FIG. 1, in order to supply stationary power consumers PC, the converter device CD, which is conventionally present per se, is additionally used to provide magnetization in the electric machine EM. The internal combustion engine ICE is driven preferably at a constant rotational speed, while the magnetization corresponds to the voltage level and voltage stability desired for the external distribution system. The converter device CD is connected, in the usual manner, with its DC voltage side to battery BA and with its AC voltage side to the first stator winding W1. Control signals, which are set on the basis of actual values of frequency F and voltage V of the power consumers PC, are output as a speed value n from a motor control device MC to the internal combustion engine ICE and as a magnetization value u to the first motor winding W1. From there, the magnetization value u is transformer-transmitted, without any special switching or connection means, to the second stator winding W2, which supplies the power consumers with a consumer energy flow $E_c$.

Figure 3:
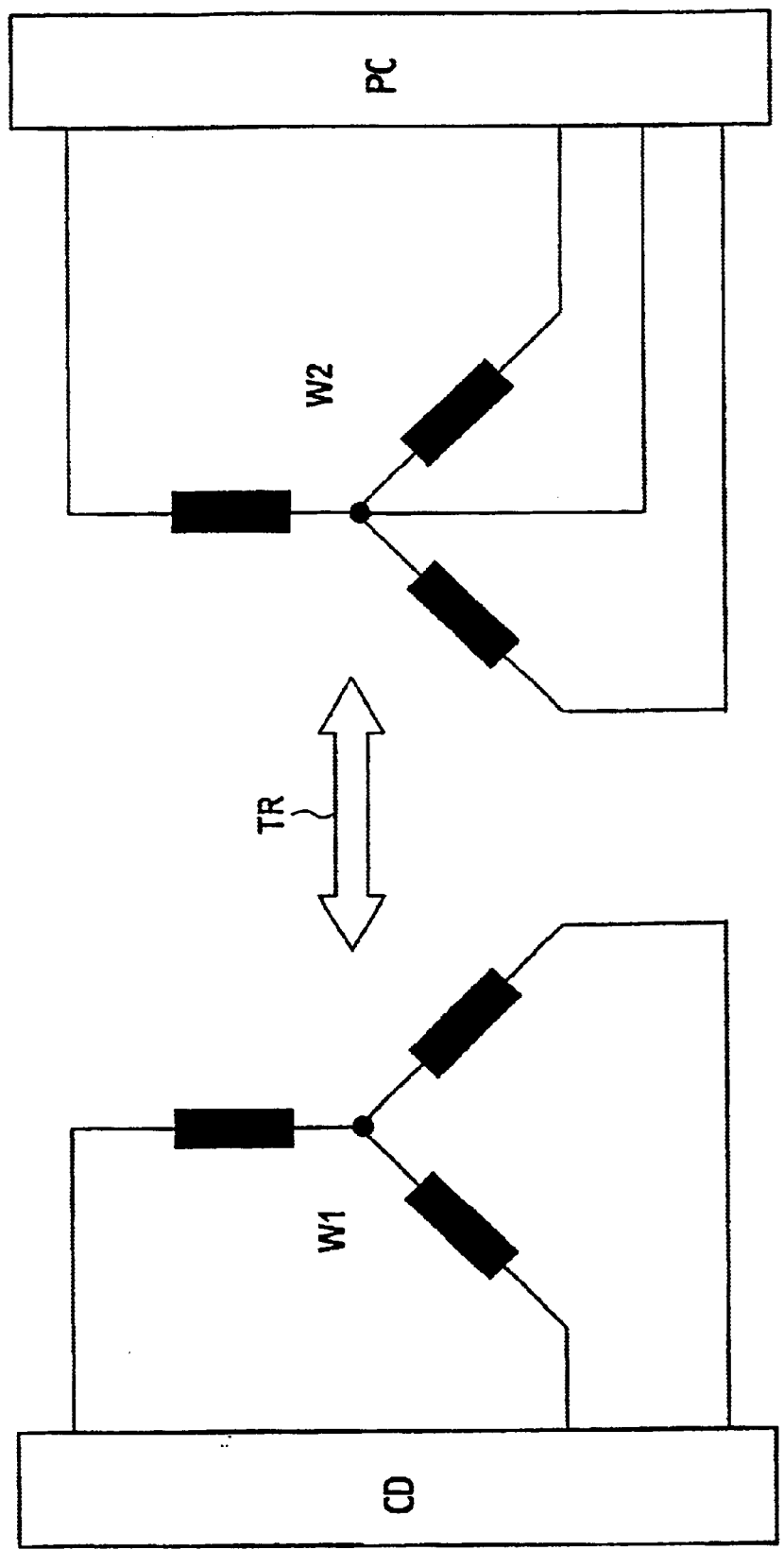
FIG. 3 shows the first and second stator winding each as a star connection, in the isolated generator operation.
Figure 4:
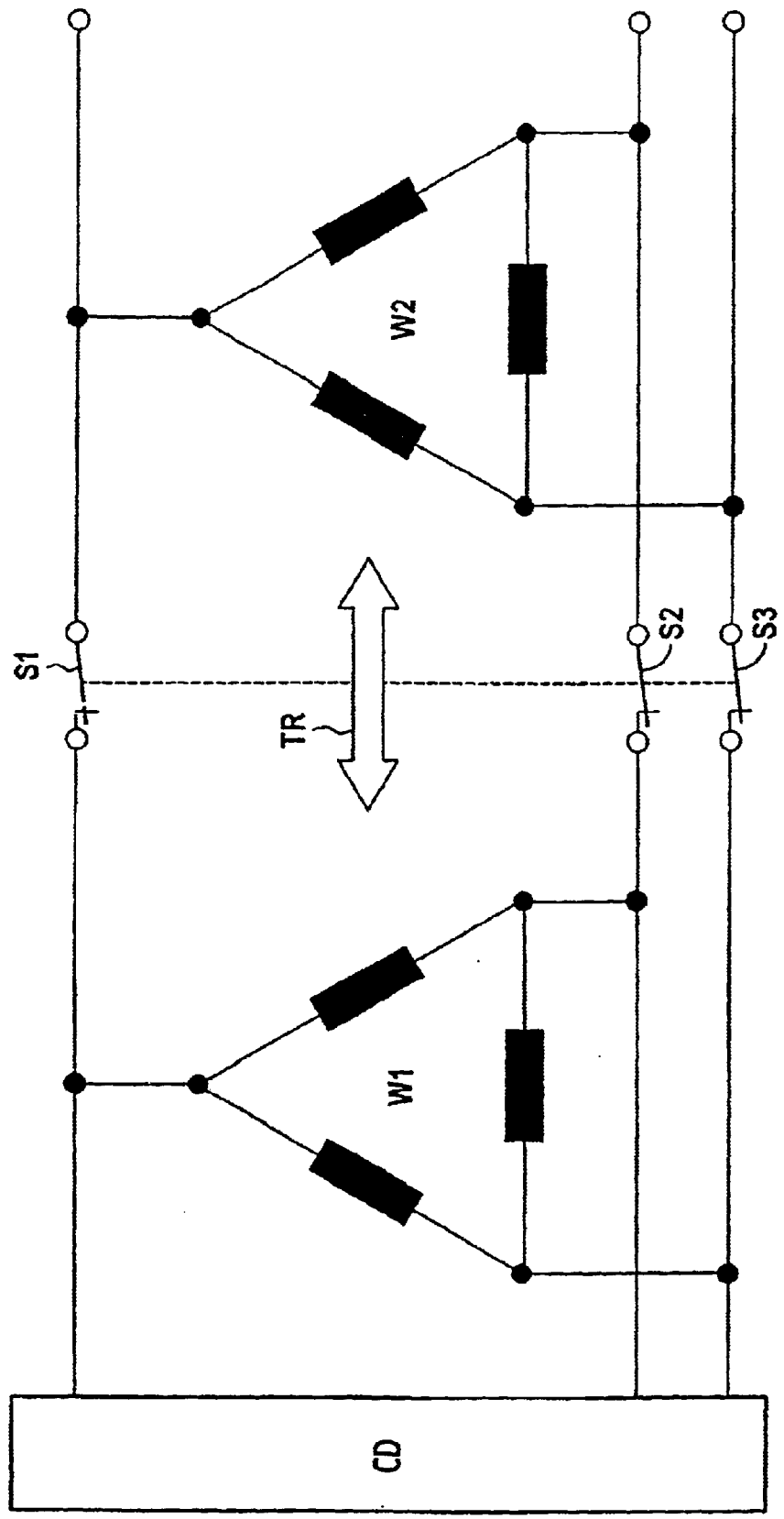
FIG. 4 shows the first and second stator winding each as a delta connection, in the traction operation.
Figure 5:
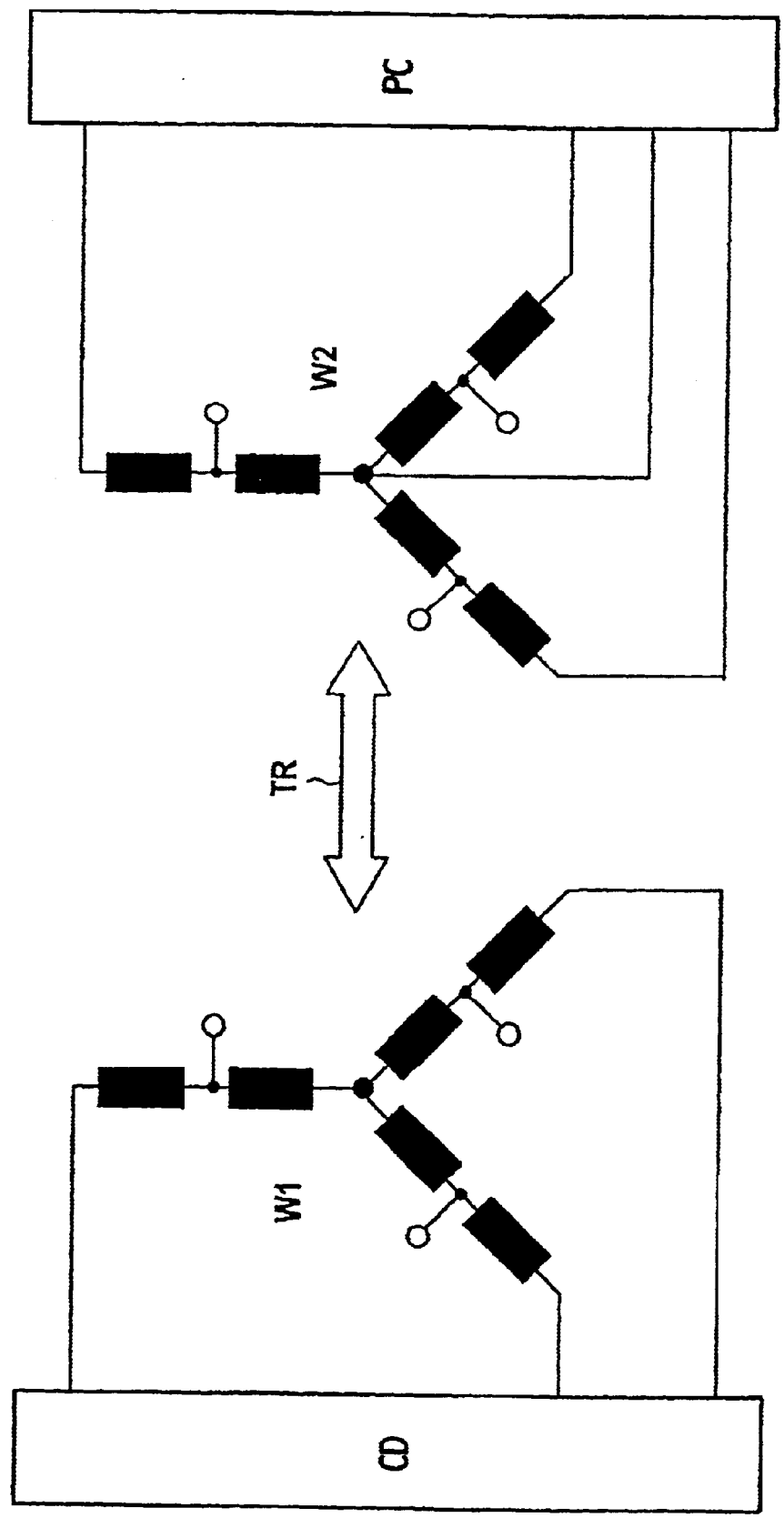
FIG. 5 shows the first and second stator winding each as a pole-changeable star connection with a low number of poles, in the isolated generator operation.

FIGS. 3 and 4 each illustrate winding circuitry of the first three-phase stator winding W1 and the second stator winding W2, which is jointly controlled through a transformer coupling TR. This circuitry is shown, by way of example, respectively, as a star-connection, in isolated generator operation, to supply the external power consumers PC, and as a delta-connection, in traction operation. According to an advantageous embodiment of the invention illustrated in FIG. 4, the second stator winding W2 can be added in traction operation via a switching device S1–S3 and can thus be used along with the stator winding W1 for traction operation.

Figure 6:
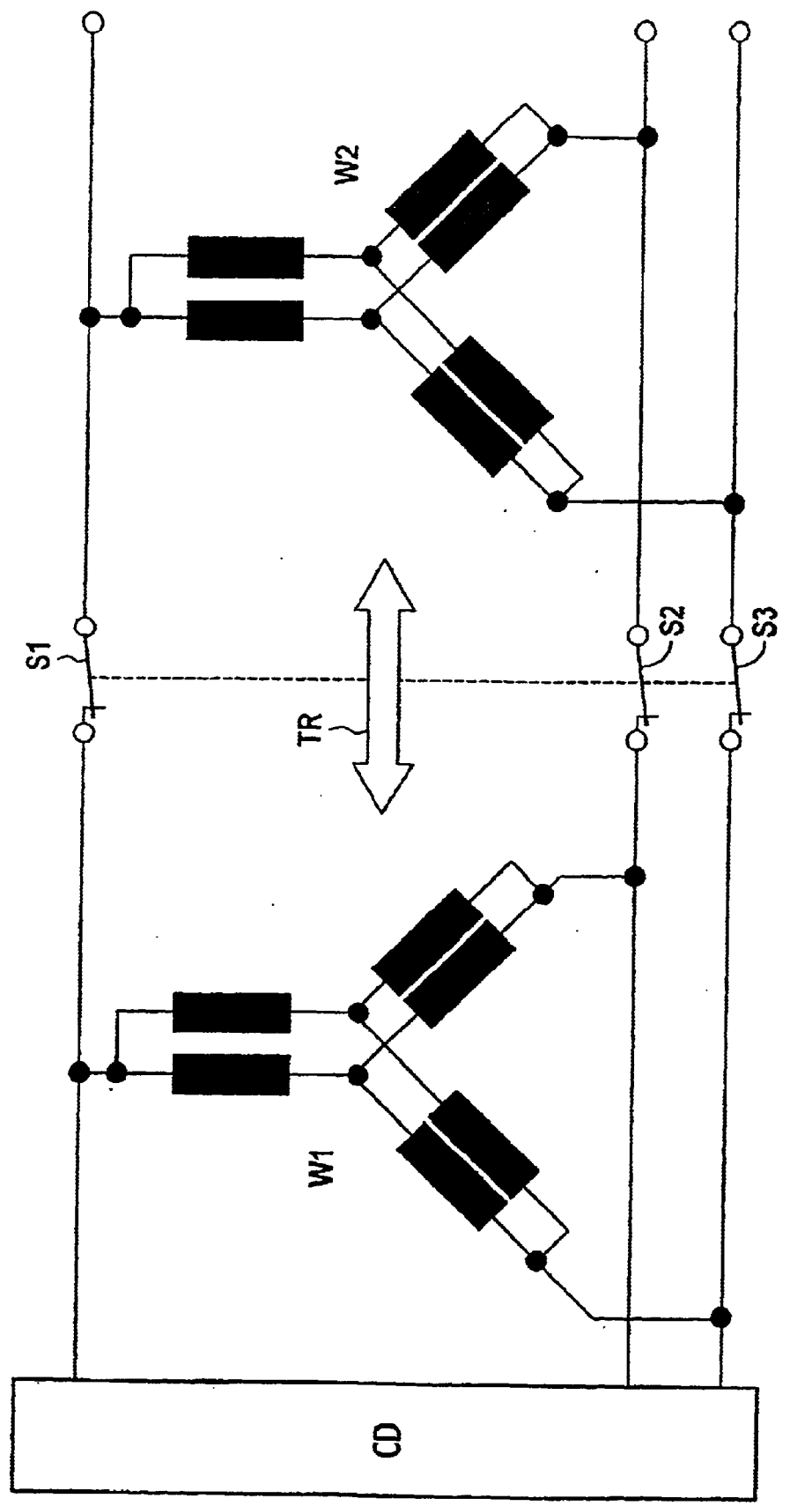
FIG. 6 shows the first and second stator winding each as a pole-changeable double star connection with a high number of poles, in the traction operation.

In a further refinement of the examples shown in FIGS. 3 and 4, FIGS. 5 and 6 each illustrate the star-connected stator windings W1, W2 with an additional pole changing control capability. According to these embodiments of the invention, the higher number of poles shown in FIG. 6 is provided in traction operation, to achieve the highest possible torque, and the lower number of poles according to FIG. 5 in isolated generator operation, to provide an energy-efficient rotational speed range for the internal combustion engine.

According to one formulation, the invention can be summarized as follows: A motor-generator system of a hybrid drive with an internal combustion engine ICE as well as an electric machine EM connected to an energy storage device BA via a converter device CD can be jointly used to supply external power consumers PC in isolated operation, with little additional complexity relative to existing technology. For this purpose, the electric machine EM, in addition to having a first stator winding W1 for traction operation, includes a second stator winding W2 for the isolated generator operation. The second stator winding W2 is advantageously transformer coupled to the first stator winding W1 and can thus be supplied with exciting current from the energy storage device BA via the converter device CD.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. Motor-generator system for a motor vehicle with hybrid traction drive, comprising:
    an internal combustion engine;
    an electric machine operable as a drive motor or as a generator driven by the internal combustion engine,
    a first stator winding assigned to the traction drive;
    a second stator winding assigned to stationary isolated generator operation of the electric machine; and
    external power consumers electrically supplied via the second stator winding;
    wherein the first stator winding and the second stator winding are arranged in a common laminated core.

2. Motor-generator system as claimed in claim 1, wherein the electric machine is an asynchronous machine with squirrel cage winding.

3. Motor-generator system as claimed in claim 1, wherein the second stator winding is configured to match a voltage level and a power demand of the external power consumers.

4. Motor-generator system as claimed in claim 1, further comprising:
    a converter device operating the electric machine in traction operation via the first stator winding; and
    a vehicle DC electrical system comprising an energy storage device
    wherein:
        the converter device is arranged between the first stator winding and the vehicle DC electrical system; and
        the converter device supplementally operates the electric machine in stationary isolated generator operation, to control at least one of voltage and speed of the electric machine.

5. Motor generator system as claimed in claim 4, wherein the energy storage device comprises a battery.

6. Motor-generator system as claimed in claim 1, wherein the second stator winding is transformer-coupled to the first stator winding.

7. Motor-generator system as claimed in claim 1, wherein the first stator winding and the second stator winding are arranged in common slots of the electric machine.

8. Motor-generator system as claimed in claim 1, wherein at least one of the first stator winding and the second stator winding is configured as a three-phase winding in a switch-selectable star-delta connection.

9. Motor-generator system as claimed in claim 1, wherein at least one of the first stator winding and the second stator winding is configured as a pole changeable winding.

10. Motor-generator system as claimed in claim 9, wherein:
    at least one of the first stator winding and the second stator winding utilize a relatively high number of poles in traction operation of the electric machine; and
    at least one of the first stator winding and the second stator winding utilize a relatively low number of poles in generator operation of the electric machine.

11. Motor-generator system as claimed in claim 1, wherein the second stator winding is utilized supplementally in traction operation of the electric machine.

12. Motor-generator system for a motor vehicle with hybrid traction drive. comprising:
    an internal combustion engine;
    an electric machine operable as a drive motor or as a generator driven by the internal combustion engine,
    a first stator winding assigned to the traction drive;
    a second stator winding assigned to stationary isolated generator operation of the electric machine; and
    external power consumers electrically supplied via the second stator winding;
    wherein the second stator winding is transformer-coupled to the first stator winding.

13. Motor-generator system as claimed in claim 12, wherein the electric machine is an asynchronous machine with squirrel cage winding.

14. Motor-generator system as claimed in claim 12, wherein the second stator winding is configured to match a voltage level and a power demand of the external power consumers.

15. Motor-generator system as claimed in claim 12, further comprising:
a converter device operating the electric machine in traction operation via the first stator winding; and
a vehicle DC electrical system comprising an energy storage device;
wherein:
the converter device is arranged between the first stator winding and the vehicle DC electrical system; and
the converter device supplementally operates the electric machine in stationary isolated generator operation, to control at least one of voltage and speed of the electric machine.

16. Motor-generator system as claimed in claim 12, wherein the first stator winding and the second stator winding are arranged in common slots of the electric machine.

17. Motor-generator system as claimed in claim 12, wherein at least one of the first stator winding and the second stator winding is configured as a three-phase winding in a switch-selectable star-delta connection.

18. Motor-generator system as claimed in claim 12, wherein at least one of the first stator winding and the second stator winding is configured as a pole changeable winding.

19. Motor-generator system as claimed in claim 18, wherein:
at least one of the first stator winding and the second stator winding utilize a relatively high number of poles in traction operation of the electric machine; and
at least one of the first stator winding and the second stator winding utilize a relatively low number of poles in generator operation of the electric machine.

20. Motor-generator system as claimed in claim 19, wherein the second stator winding is utilized supplementally in traction operation of the electric machine.

\* \* \* \* \*